United States Patent
Xu et al.

(10) Patent No.: US 9,912,576 B2
(45) Date of Patent: Mar. 6, 2018

(54) METHOD AND SYSTEM FOR DETECTING NORMALIZATION OF FORWARDING BEHAVIOR OF ROUTER IN CORE ROUTING AREA

(71) Applicant: Tsinghua University, Beijing (CN)

(72) Inventors: Ke Xu, Beijing (CN); Fan Yang, Beijing (CN); Meng Shen, Beijing (CN); Wenlong Chen, Beijing (CN); Youjian Zhao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 91 days.

(21) Appl. No.: 15/099,648

(22) Filed: Apr. 15, 2016

(65) Prior Publication Data

US 2016/0315846 A1      Oct. 27, 2016

(30) Foreign Application Priority Data

Apr. 27, 2015   (CN) .......................... 2015 1 0203080

(51) Int. Cl.
| H04L 12/28 | (2006.01) |
| H04L 12/56 | (2006.01) |
| H04L 12/755 | (2013.01) |
| H04L 12/721 | (2013.01) |
| H04L 12/851 | (2013.01) |
| H04L 12/703 | (2013.01) |
| H04L 12/46 | (2006.01) |

(52) U.S. Cl.
CPC ........ *H04L 45/021* (2013.01); *H04L 12/4625* (2013.01); *H04L 45/28* (2013.01); *H04L 45/38* (2013.01); *H04L 47/2483* (2013.01)

(58) Field of Classification Search
USPC ......................................................... 370/392
See application file for complete search history.

(56) References Cited

U.S. PATENT DOCUMENTS

2016/0301564 A1* 10/2016 Xu ..................... H04L 41/0869

* cited by examiner

*Primary Examiner* — Chuong T Ho
(74) *Attorney, Agent, or Firm* — Hodgson Russ LLP

(57) ABSTRACT

The present disclosure provides a method and system for detecting normalization of forwarding behavior of a router in a core routing area. The method includes: obtaining data flow received by ports of a core router; performing matching check to the data flow according to the data flow state table; if the data flow does not match the data flow state table, checking state of the data flow to calculate a state check result S(i); determining whether the data flow state table needs to be updated, if yes, updating the data flow state table; and determining whether the state check result S(i) is a trigger state, if yes, calculate state r of the forwarding behavior of the core router, and determining whether the forwarding behavior of the core router is abnormal according to the state r of the forwarding behavior of the core router, if yes, generating an alert log.

10 Claims, 3 Drawing Sheets

METHOD AND SYSTEM FOR DETECTING NORMALIZATION OF FORWARDING BEHAVIOR OF ROUTER IN CORE ROUTING AREA

CROSS-REFERENCE TO RELATED APPLICATION

This application claims priority to and benefits of Chinese Patent Application Serial No. 201510203080.5, filed with the State Intellectual Property Office of P. R. China on Apr. 27, 2015, the entire contents of which are incorporated herein by reference.

FIELD

The present disclosure relates to a router field, and more particularly, to a method and a system for detecting normalization of forwarding behavior of a router in a core routing area.

BACKGROUND

A router is equipment that connects local area networks (LAN) and wide area networks (WAN) in internets. The router can choose and set optimal routes automatically according to channel status to send signals by orders. The router is core equipment that achieves network sharing, data packet forwarding and data-flow filtration control, etc. in the network. Failure of the router producer to ensure security and reliability of data service provided by the router causes security risks in the open network. How to protect completion of the user data that are forwarded by the router from source terminal to destination terminal makes an important point of credibility detection of the router. That is to say, key of the credibility detection of the router is that, whether the router can act according to users' expectation.

Currently, research for the credibility of the behavior of the router is a hot topic for the network security, especially for routing security.

SUMMARY

Embodiments of a first aspect of the present disclosure provide a method for detecting normalization of forwarding behavior of a router in a core routing area, including following steps:

obtaining data flow received by ports of a to-be-detected core router which are directly connected to peripheral network equipment; generating a data flow state table initially, and performing matching check to the data flow according to the data flow state table; if the data flow does not match the data flow state table, checking state of the data flow to obtain characteristic parameters of the data flow to calculate a state check result S(i); determining whether the data flow state table needs to be updated, if yes, updating the data flow state table; and determining whether the state check result S(i) is a trigger state, if yes, using the to-be-detected core router together with the peripheral network equipment to calculate state r of the forwarding behavior of the to-be-detected core router, and determining whether the forwarding behavior of the to-be-detected core router is abnormal according to the state r of the forwarding behavior of the to-be-detected core router, if yes, generating an alert log.

In the method of the embodiment of the present disclosure, under normal work of the routing protocol, determination and calculation of characteristic parameters of the data flow, such as the input port, the inquiry port and the output port, etc. are done by checking state of the data flow the peripheral network equipment of the core router. Abnormal forwarding behavior of the core router can be alerted. The method can determine whether the forwarding behavior of the router is normal effectively. The method can reduce checking times effectively and ensures credibility and flexibility because of reasons such as link failure being considered and the data flow state table being established in the state checking process. The method provides important means for monitoring and diagnosing normalization of behavior of the router.

Embodiments of a second aspect of the present disclosure provide a system for detecting normalization of forwarding behavior of a router in a core routing area, including: an obtaining module, configured to obtain port states P(j) of each to-be-detected router in the core routing area, one router in the core routing area being a peripheral network equipment to another router in the core routing area, dataflow matching check is performed to all peripheral network equipment, by using the method of claim 1, to generate the port states of a router whose forwarding behavior is abnormal, allowing the obtaining module to obtain; a determining module, configured to calculate state r(k) of the forwarding behavior of each to-be-detected router in the core routing area, and determine whether r(k) is equal to zero, and if no, determine the forwarding behavior of a router k is abnormal; and a processing module, configured to calculate state R of the forwarding behavior in the core routing area, and determine whether abnormal forwarding behavior exists in the core routing area according to the state R of the forwarding behavior, and if yes, generate an alert log.

The system in the embodiment of the present disclosure can achieve detection of normalization of forwarding behavior in the core routing area by using each to-be-detected router as the peripheral network equipment to each other for a scale-expandable core routing area under different scenarios, and output the alert log. This further improves application effect of the present disclosure and enhances credibility of data service of the core routing area.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
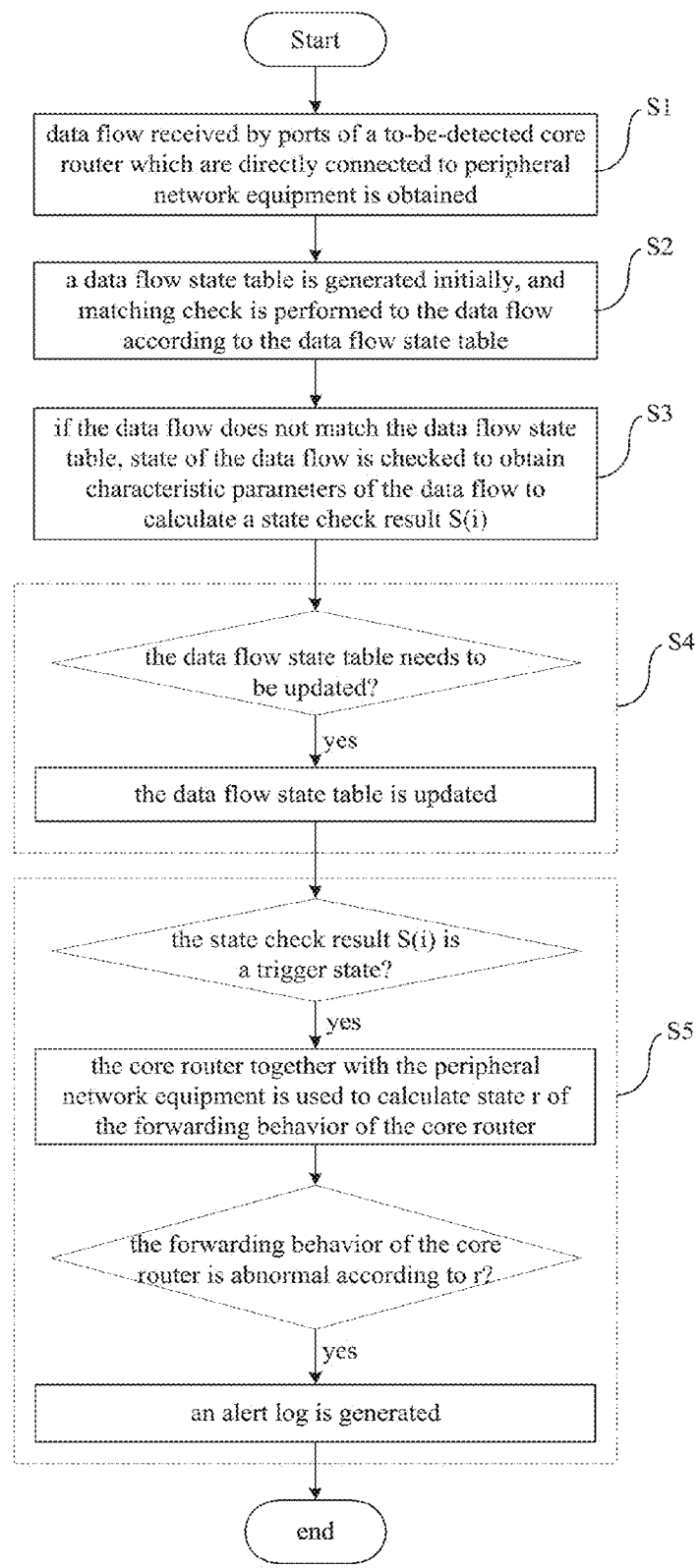
FIG. 1 is a flow chart of a method for detecting normalization of forwarding behavior of a router in a core routing area, according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Following are detailed descriptions for a method and a system for detecting normalization of forwarding behavior of a router in a core routing area.

FIG. 1 is a flow chart of a method for detecting normalization of forwarding behavior of a router in a core routing area, according to one embodiment of the present disclosure. It is noted that, the premise for determination of state of the data flow is that the routing is bilateral symmetry. The following descriptions are based on such premise. As shown in FIG. 1, the method includes the following steps.

In step S1, data flow received by ports of a to-be-detected core router which are directly connected to peripheral network equipment is obtained.

In step S2, a data flow state table is generated initially, and matching check is performed to the data flow according to the data flow state table.

Specifically, the data flow state table includes: source network segment address, destination network segment address, input port, inquiry port, output port, the state check result S(i), and timer. The source/destination network segment address means that, in the first data packet of one data flow, the network prefix address matching the source/destination address when inquiring a routing table. The input port means that an actual input port through which the data flow is inputted into the peripheral network equipment. The inquiry port means that, if the source address of the data flow is regarded as a reverse destination address, an output port obtained by inquiring the routing table is regarded as the inquiry port. The output port means that an output port obtained by using the destination address of the data flow to inquire the routing table. The state check result S(i) has two types: one is normal state (S(i)=0) and another is trigger state (S(i)=1). The state check result S(i) being normal state indicates that there is no abnormal forwarding behavior existing in the router. The tinier presents a period for storage timeout of an entry in the routing table.

The data flow state table is read directly in the subsequent detection. First, matching check is performed to the source address, the destination address of the to-be-detected data flow, and the input port. The source/destination address and the source/destination segment address in the routing table are calculated by using a longest prefix matching method. If the three entries of the to-be-detected data flow match one entry in the data flow state table, then, the state check result recorded in this entry is regarded as the state check result S(i) of the to-be-detected data flow.

In step S3, if the data flow does not match the data flow state table, state of the data flow is checked to obtain characteristic parameters of the data flow to calculate a state check result S(i).

If the to-be-detected data flow does not match the data flow state table, this means that one of the following conditions happens: the source address of the to-be-detected data flow does not match the source segment address in the data flow state table; the destination address of the to-be-detected data flow does not match the destination segment address in the data flow state table; the input port of the to-be-detected data flow does not match the input port in the data flow state table. At this time, state of the data flow needs to be checked to obtain the state check result S(i).

The state check result S(i) is calculated by using the following expressions:

$$S(i) = f_a(x_1, x_2) \oplus f_b(x_3)|_{f_a=0} + f_a(x_1, x_2) \oplus f_c(x_4)|_{f_a=1},$$

and initially $f_a=0$, $f_b=1$, $f_c=0$.

Specifically, for one inputted data flow, first, relevant information of the first data packet of the one inputted data flow is obtained, which includes field values of the input port, the sources address and the inquiry port. The field value of the input port is assigned to $x_1$. The field value of the inquiry port is assigned to $x_2$. The inquiry state of the router is obtained by inquiring the corresponding entry of the routing table. For example, the router can be inquired to determine whether the router performs route recalculation and updating because of link failure or unreachability, etc. The inquiry state is assigned to $x_3$. Then, the relevant information of the first data packet of the one inputted data flow can be obtained continuously, which includes field values of the destination address and the output port. Whether the state of the output port is null is assigned to $x_4$ (the state of the output port being null can be: there being no matching entry with the destination address after inquiring the routing table, and the matching entry being a reverse path, or the next hop gateway address of the comparison default router belonging to different network segments).

After obtaining $x_1$, $x_2$, $x_3$ and $x_4$, whether $x_1$ is the same as $x_2$ is determined by using $f_a(x_1, x_2)$. If $x_1$ is the same as $x_2$, then $f_a(x_1, x_2)=1$. If $x_1$ is not the same as $x_2$, then $f_a(x_1, x_2)=0$. Correspondingly, $f_b(x_3)|_{f_a}$ represents that, whether $x_3$ fits a state b is determined under satisfaction of condition $f_a$. The state b represents the router is under non-update state. If $x_3$ fits the state b, then $f_b(x_3)|_{f_a}=1$, and if not, then $f_b(x_3)|_{f_a}=0$. $f_c(x_4)|_{f_a}$ represents that, whether $x_4$ fits a state c is determined under satisfaction of condition $f_a$. The state c represents the state of the output port is not null. If $x_4$ fits the state c, then $f_c(x_4)|_{f_a}=1$, and if not then $f_c(x_4)|_{f_a}=0$. It is noted that if condition $f_a$ of $f_b(x_3)|_{f_a}$ is not satisfied, $f_b=1$ is used in $f_b(x_3)|_{f_a}$ to calculate, and if condition $f_a$ of $f_c(x_4)|_{f_a}$ is not satisfied, $f_c=0$ is used in $f_c(x_4)|_{f_a}$ to calculate.

The value of the state check result S(i) of the to-be-detected data flow can be calculated according to the above expressions.

In step S4, whether the data flow state table needs to be updated is determined, if yes, the data flow state table is updated.

In the embodiment of the present disclosure, when one of following conditions is satisfied, the data flow state table is updated.

1) In step S3, under excluding the condition of the state check result being $f_a=0$ and S(i)=0, if a new update entry for the data flow state table is generated, storing a new entry corresponding a update entry for the data flow state table which is generated in step S3;

2) synchronization with dynamic change of a routing table being needed;

3) number of stored entry list of the data flow state table reaching a upper limit or preset timer for one entry in the data flow state table being overdue and the one entry willing be deleted.

In step S5, whether the state check result S(i) is a trigger state is determined, if yes, the to-be-detected core router together with the peripheral network equipment is used to calculate state r of the forwarding behavior of the to-be-detected core router, and whether the forwarding behavior of the to-be-detected core router is abnormal is determined according to the state r of the forwarding behavior of the to-be-detected core router, if yes, an alert log is generated.

The state r of the forwarding behavior of the core router in the core routing area is calculated by using the following expressions:

$$r = \sum_{j=0}^{n} p(j),$$

and p(j) represents a port state corresponding to port j of the core router, and j=0, 1, 2, . . . , n, p(j) is initially equal to zero. Specifically, in step S3, once the state check result S(i) of one to-be-detected data flow generated by one peripheral network equipment e is equal to 1, i.e., the state check result S(i) is a trigger state. Then, problems need to be determined. There are two situations for determining the problems. 1) in step S3, the one peripheral network equipment e, which triggers the problems firstly, needs to request global network topology data based on the state check result S(i)=1 generated by $f_a$=0. A theoretical path L1 from the source address of the problematic data flow to the destination address of the problematic data flow, which meets the current routing protocol, is calculated to determine whether the one peripheral network equipment e is included in the theoretical path L1. If the one peripheral network equipment e is included in the theoretical path L1, a theoretical path L2 from the source address of the problematic data flow to the last-hop address corresponding to the input port of the problematic data flow, which meets the current routing protocol, is calculated according to the global network topology data. The theoretical path L1 is compared to the theoretical path L2 to record the address of overlapped path node. The state $p_u(j)$ belonging to port j of the router u whose address is the same as the address of the overlapped path node is set to 1 (if the address of the overlapped path node is not the port address of the router which is directly connected to the one peripheral network equipment e, the address of the overlapped path node is recorded in an error report and the error report is sent to the peripheral network equipment connected to the overlapped path node); if the one peripheral network equipment e is not included in the theoretical path L1, the last-hop address corresponding to the input port of the problematic data flow is recorded, and the state $p_v(j)$ belonging to port j of the router v is set to 1. Address of the router v is the same as the last-hop address and the router v is directly connected to the one peripheral network equipment e. 2) in step S3, the last-hop address corresponding to the input port of the problematic data flow is recorded based on the state check result S(i)=1 generated by $f_a$=0. The state $p_v(j)$ belonging to port j of the router v is set to 1. Address of the router v is the same as the last-hop address and the router v is directly connected to the one peripheral network equipment e. The peripheral network equipment of the to-be-detected core router are used to calculate the value of the state r of the forwarding behavior of the to-be-detected core router. If in each port belonging to the core router, $\forall p(j)=1$ (j=0, 1, 2 . . . n), then it can be certain that r≠0. At this time, it is determined that the forwarding behavior of the core router is abnormal and the alert log is generated and outputted.

In the method of the embodiment of the present disclosure, under normal work of the routing protocol, determination and calculation of characteristic parameters of the data flow, such as the input port, the inquiry port and the output port, etc. are done by checking state of the data flow the peripheral network equipment of the core router. Abnormal forwarding behavior of the core router can be alerted. The method can determine whether the forwarding behavior of the router is normal effectively. The method can reduce checking times effectively and ensures credibility and flexibility because of reasons such as link failure being considered and the data flow state table being established in the state checking process. The method provides important means for monitoring and diagnosing normalization of behavior of the router.

An exemplary embodiment of the method for detecting normalization of the forwarding behavior of a single core router follows.

Figure 2:
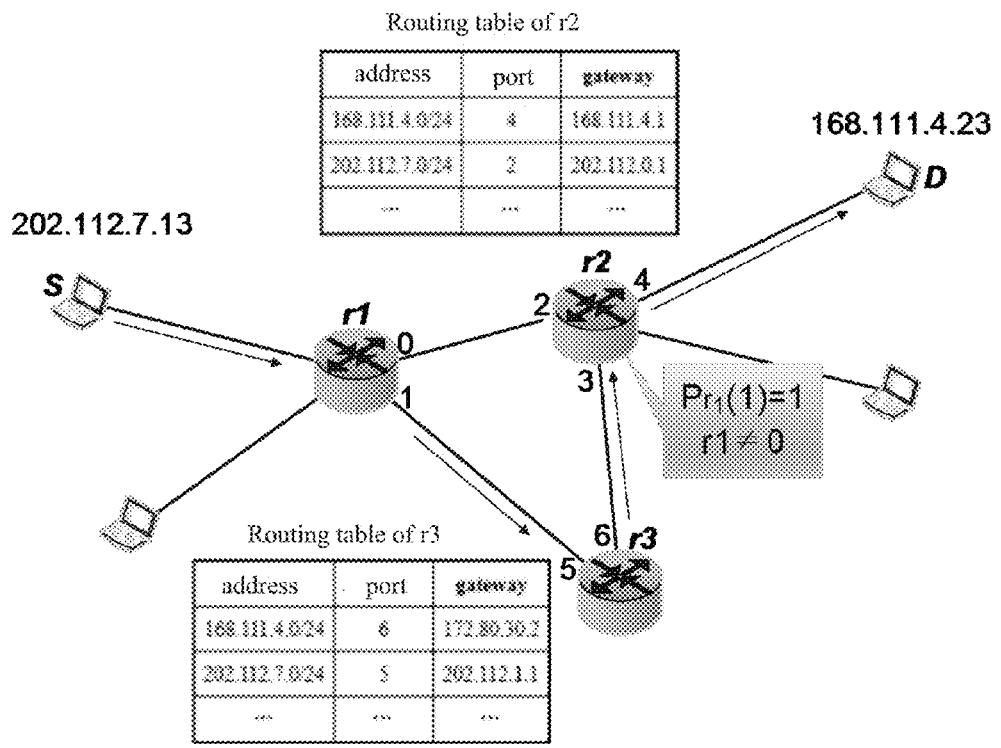
FIG. 2 is a simplified topology and information illustration between a core router r1 and peripheral network equipment r2 and r3, according to an embodiment of the present disclosure.

FIG. 2 shows a simplified topology and information illustration between a core router r1 and peripheral network equipment r2, r3. The used routing protocol is OSPF (Open Shortest Path First) protocol. Normal forwarding path of the data flow calculated by the routing protocol from the source terminal S (the source address is 202.112.7.13) to the destination terminal D (the destination address is 168.111.4.23) is S→$r_1$→$r_2$→D (routing bilateral symmetry is presumed). If the core router r1 forwards the data flow to another peripheral network equipment r3 due to abnormal forwarding behavior of the core router r1, the network equipment r3 forwards the data flow to the network equipment r2 after inquiring the routing table to achieve data transmission to the destination terminal D. Then, the actual forwarding path changes to S→$r_1$→$r_3$→$r_2$→D. Under this situation, process of the method for detecting normalization of the internal routing forwarding behavior of the peripheral network equipment r2 and r3 and process of generating the alert log are described detailedly as following, a) Regarding network equipment r3:

① The data flow (source address 202.112.7.13→destination address 168.111.4.23) sent by port 1 of the core router r1 is received and regarded as the to-be-detected data flow.

② Matching check is performed to the to-be-detected data flow according to the data flow state table. Table 1 shows entry records of the current data flow state table. The source address of the to-be-detected data flow does not match source network segment address in the entry records of the current data flow state table. Matching check fails and then state of the data flow is checked.

TABLE 1

| data flow state table of the network equipment r3 | | | | | | |
|---|---|---|---|---|---|---|
| Source network segment address | Destination network segment address | Input port | Inquiry port | Output port | Alert state S(i) | Timer |
| 167.111.3.0/24 | 201.111.6.0/24 | 7 | 7 | 9 | 0 | time |

③ The parameters $x_1$ and $x_2$ need to be obtained to check the state of the data flow. The parameter $x_1$ is port 5 and the parameter $x_2$ is port 5 after analyzing field information in head of the first data packet of the data flow Port 5 for $x_1$ is the actual input port through which the data flow enters the network equipment r3. Port 5 for $x_2$ is an inquiry port after inquiring the routing table of the network equipment r3 by using 202.112.7.13 as the reverse destination address. $f_a(x_1, x_2)=1$ is calculated. Then, the parameter $x_4$ is obtained. The parameter $x_4$ represents the output port being not null. Port 6 for $x_4$ is an output port after inquiring the routing table of the network equipment r3 by using 168.111.4.23 as the destination address. $f_c(x_4)|_{f_a=1}=1$ is calculated. The initial value of $f_b(x_3)|_{f_a=0}$ is equal to 1 because of un-satisfying condition $f_a=0$. The calculation for the following expression can be done by using the above results: $S(i)=f_a(x_1,x_2)\oplus f_b(x_3)|_{f_a=0}+f_a(x_1,x_2)\oplus f_c(x_4)|_{f_a=1}=1\oplus 1+1\oplus 1=0$. After determining un-satisfaction of condition $f_a=0$ and $S(i)=0$, the data flow state table is updated.

④ Table 2 shows the entry records of the data flow state table after updated.

TABLE 2 data flow state table of the network equipment r3

| Source network segment address | Destination network segment address | Input port | Inquiry port | Output port | Alert state S(i) | Timer |
|---|---|---|---|---|---|---|
| 167.111.3.0/24 | 201.111.6.0/24 | 7 | 7 | 9 | 0 | time |
| 202.112.7.0/24 | 168.111.4.0/24 | 5 | 5 | 6 | 0 | time |

The subsequent data packets of the data flow can match the updated data flow state table successfully and the state check is not needed.

⑤ Because the state check result $S(i)=0$, no alert is generated and the detection is finished.

b) Regarding the Network Equipment r2:

① The data flow source address 202.112.7.13→destination address 168.111.4.23) sent by port 6 of the network equipment r3 is received and regarded as the to-be-detected data flow.

② Matching check is performed to the to-be-detected data flow according to the data flow state table. Table 3 shows entry records of the current data flow state table. The source address of the to-be-detected data flow does not match source network segment address in the entry records of the current data flow state table. Matching check fails and then state of the data flow is checked.

TABLE 3 data flow state table of the network equipment r2

| Source network segment address | Destination network segment address | Input port | Inquiry port | Output port | Alert state S(i) | Timer |
|---|---|---|---|---|---|---|
| 166.111.2.0/24 | 200.111.5.0/24 | 8 | 8 | 2 | 0 | time |

③ The parameters $x_1$ and $x_2$ need to be obtained to check the state of the data flow. The parameter $x_1$ is port 3 and the parameter $x_2$ is port 2 after analyzing field information in head of the first data packet of the data flow $f_a(x_1,x_2)=0$ is calculated. Then, the parameter $x_3$ is obtained. The parameter $x_3$ represents that the routing entry corresponding to the data flow is not in the update stage. $f_b(x_3)|_{f_a=0}=1$ is calculated. The initial value of $f_c(x_4)|_{f_a=1}$ is equal to zero because condition $f_a$ is not satisfied. The calculation for the following expression can be done by using the above results: $S(i)=f_a(x_1,x_2)\oplus f_b(x_3)|_{f_a=0}+f_a(x_1,x_2)\oplus f_c(x_4)|_{f_a=1}=0\oplus 1+0\oplus 0=1$. $f_a=0$ but $S(i)=1$ is determined. This does not meet $f_a=0$ and $S(i)=0$ and is determined to be an exception. After determining that the exception is not an updating condition for the data flow state table, updating step for the data flow state table is performed.

④ Table 4 shows the entry records of the data flow state table after updated.

TABLE 4 data flow state table of the network equipment r2

| Source network segment address | Destination network segment address | Input port | Inquiry port | Output port | Alert state S(i) | Timer |
|---|---|---|---|---|---|---|
| 166.111.2.0/24 | 200.111.5.0/24 | 8 | 8 | 2 | 0 | time |
| 202.112.7.0/24 | 168.111.4.0/24 | 3 | 2 | 4 | 1 | time |

⑤ Because the state check result $S(i)=1$, the alert is triggered and problems need to be determined. Because in step ③, the network equipment r2, which triggers the problems, needs to request the global network topology data based on the state check result $S(i)=1$ generated by $f_a=0$. A theoretical path L1 from the source address (202.112.7.13) of the problematic data flow to the destination address (168.111.4.23) of the problematic data flow, which meets the current routing protocol, is calculated to be $S \to r_1 \to r_2 \to D$ (it is known from the above presumed network topology environment). The peripheral network equipment r2 is determined to be included in the theoretical path L1. A theoretical path L2 from the source address (202.112.7.13) of the problematic data flow to the last-hop address (172.80.30.2) corresponding to the parameter 3 of the input port of the problematic data flow, which meets the current routing protocol, is calculated to be $S \to r_1 \to r_3$ according to the global network topology data. The theoretical path L1 is compared to the theoretical path L2 to record the address r1 of overlapped path node. The state $p_{r1}(1)$ belonging to port 1 of the router r1 whose address is the same as the address r1 of the overlapped path node is set to 1. The state $$r_1 = \sum_{j=0}^{1} p_{r1}(j)$$

of the forwarding behavior of the core router r1 is calculated by using the peripheral network equipment r2 and r3, and $p_{r1}(1)=1$, i.e., $r_1 \neq 0$. The forwarding behavior of the core router r1 is determined to be abnormal. The alert log is generated and outputted.

For implementation of the above embodiment, a system for detecting normalization of forwarding behavior of a router in a core routing area is provided in the embodiment of the present disclosure.

Figure 3:
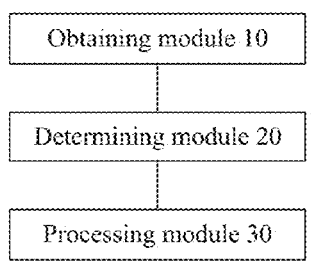
FIG. 3 is a block diagram of a system for detecting normalization of forwarding behavior of a router in a core routing area, according to an embodiment of the present disclosure.

FIG. 3 is a block diagram of a system for detecting normalization of forwarding behavior of a router in a core routing area, according to an embodiment of the present disclosure.

In FIG. 3, the system includes an obtaining module 10, a determining module 20 and a processing module 30.

The obtaining module 10 is configured to obtain port states P(j) of each to-be-detected router in the core routing area. One router in the core routing area can be a peripheral network equipment to another router in the core routing area. Data-flow matching check is performed to all peripheral network equipment, by using the method of the above embodiment, to generate the port states of a router whose forwarding behavior is abnormal, allowing the obtaining module 10 to obtain.

The determining module 20 is configured to calculate state r(k) of the forwarding behavior of each to-be-detected router in the core routing area, and determine whether r(k) is equal to zero, and if no, determine the forwarding behavior of a router k is abnormal and trigger the processing module 30 to generate results.

The processing module 30 is configured to calculate state R of the forwarding behavior in the core routing area, and determine whether abnormal forwarding behavior exists in the core routing area according to the state R of the forwarding behavior, and if yes, generate an alert log.

Specifically, in the core routing area consisting of a number of core routers, different routers can be peripheral network equipment for other routers. Matching check for received data flow is performed to all peripheral network equipment in the core routing area, by using the method of the above embodiment. Once the alert is generated, the value of port state $P_k(j)$ of port j of the router k is set to 1. The obtaining module 10 obtains the port state $P_k(j)$ of each to-be-detected router in the core routing area. That is to say, the obtaining module 10 can obtain abnormal value of $P_k(j)=1$ of the router k. The determining module 20 receives all abnormal values sent by the obtaining module 10 to calculate the state r(k) of the forwarding behavior of each to-be-detected router, and determine whether r(k) is equal to zero. If yes, it indicates that there is no abnormal forwarding behavior existing in the router. If no, the determining module 20 determines that the forwarding behavior of a router k is abnormal and triggers the processing module 30 to generate the result.

The state r(k) of the forwarding behavior of the to-be-detected router satisfies a following expression:

$$r(k) = \sum_{j=0}^{n} P_k(j),$$

and r(k) initially equal to zero.

In the above expression, $P_k(j)$ represents a port state corresponding to port j of the k-th to-be-detected router, and j=0, 1, 2, . . . , n.

The determining module 20 sends the abnormal state. The processing module 30 receives the abnormal state sent by the determining module 20 and calculates the value of state R of the forwarding behavior in the core routing area.

The state R of the forwarding behavior in the core routing area satisfies a following expression:

$$R = \sum_{k=1}^{m} r(k),$$

and k=1, 2, . . . , m, and m is number of the core router in the core routing area, and initially, R=0.

If $\forall r(k) \neq 0$ (k=1, 2, . . . m), then R≠0. At this time, the processing module 30 determines that there is abnormal forwarding behavior existing in the core routing area and generates the alert log. It is noted that, number of the core router included in the core routing are can be changed according to need and therefore, the core routing area is expandable. A new detecting system can be obtained smoothly by changing number of the obtaining module in the original detecting system.

An exemplary embodiment of the system for detecting normalization of the forwarding behavior of a single core router follows.

Figure 4:
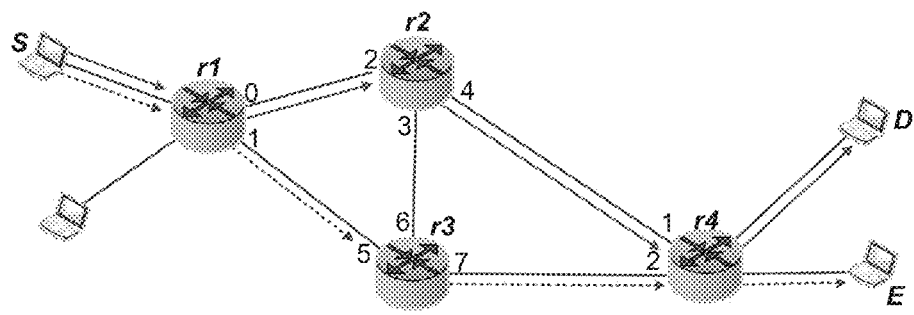
FIG. 4 is a simplified topology of a core routing area including core routers r1, r2, r3 and r4, according to an embodiment of the present disclosure.

It is presumed that the core routers r1, r2, r3, and r4 are in the core routing area R. FIG. 4 shows a simplified topology of the core routing area R. Normal forwarding path of one data flow from the source terminal S to the destination terminal D is S→$r_1$→$r_2$→$r_4$→D and normal forwarding path of another data flow from the source terminal S to the destination terminal E is S→$r_1$→$r_3$→$r_4$→E (routing bilateral symmetry is presumed).

Figure 5:
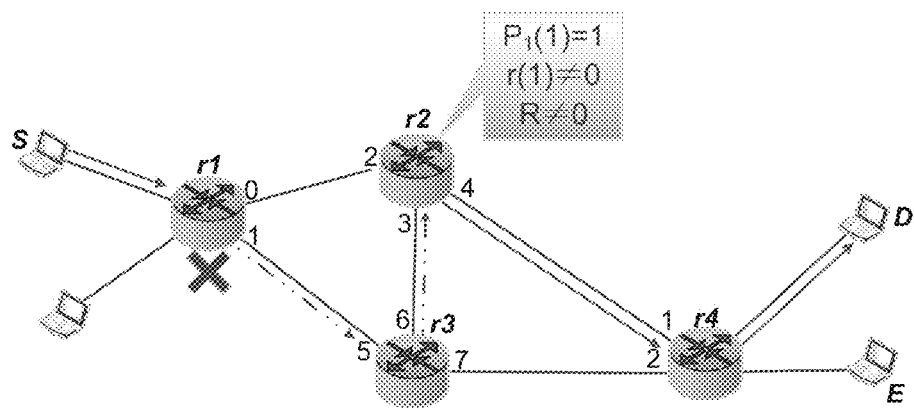
FIG. 5 is a schematic view for detecting abnormal forwarding behavior in a core routing area, according to an embodiment of the present disclosure.

First, if forwarding behavior of the core router r1 is abnormal, the actual forwarding behavior path from S→E changes to S→$r_1$→$r_3$→$r_2$→$r_4$→D (as shown in FIG. 5). According to demonstration of the above embodiment, the state $P_1(1)$ of port 1 of the core router r1 is equal to one, and r(1)≠0, and $$R = \sum_{k=1}^{4} r(k) \neq 0$$

are generated. That is, there is abnormal forwarding behavior existing in the core routing area, and the alert log including information of the router and the port whose forwarding behavior is abnormal (for example, $P_1(1)=1$ is labeled) is generated and outputted.

Figure 6:
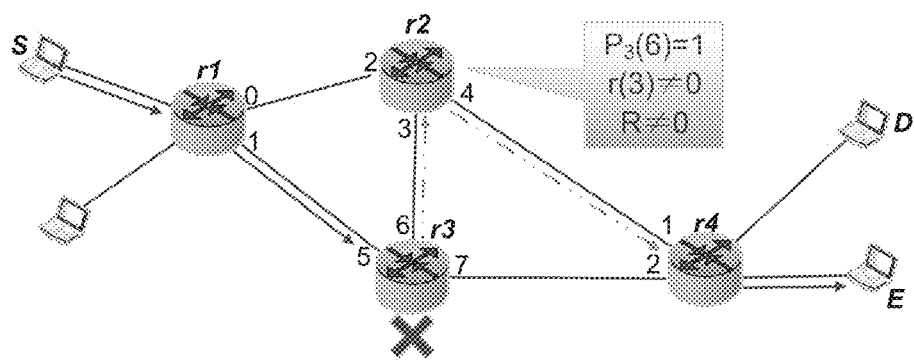
FIG. 6 is another schematic view for detecting abnormal forwarding behavior in a core routing area, according to an embodiment of the present disclosure.

Second, if forwarding behavior of the core router r3 is abnormal, the actual forwarding behavior path from S→E changes to S→$r_1$→$r_3$→$r_2$→$r_4$→E (as shown in FIG. 6). Similarly, the state $P_3(6)$ of port 6 of r3 is equal to 1, and r(3)≠0 and $$R = \sum_{k=1}^{4} r(k) \neq 0$$

are generated. That is, there is abnormal forwarding behavior existing in the core routing area, and the alert log including information of the router and the port whose forwarding behavior is abnormal (for example, $P_3(6)=1$ is labeled) is generated and outputted.

The system in the embodiment of the present disclosure can achieve detection of normalization of forwarding behavior in the core routing area by using each to-be-detected router as the peripheral network equipment to each other for a scale-expandable core routing area wider different scenarios, and output the alert log. This further improves application effect of the present disclosure and enhances credibility of data service of the core routing area.

In the following, a non-transitory computer-readable storage medium according to embodiments of the present disclosure will be described in detail.

In some embodiments, the non-transitory computer-readable storage medium having stored therein instructions that, when executed by a processor of a device, causes the device to perform a method for detecting normalization of forwarding behavior of a router in a core routing area. The method includes following steps:

obtaining data flow received by ports of a to-be-detected core router which are directly connected to peripheral network equipment;

generating a data flow state table initially, and performing matching check to the data flow according to the data flow state table;

if the data flow does not match the data flow state table, checking state of the data flow to obtain a state check result S(i) by obtaining characteristic parameters of the data flow;

determining whether the data flow state table needs to be updated, if yes, updating the data flow state table; and determining whether the state check result S(i) is a trigger state, if yes, using the to-be-detected core router together with the peripheral network equipment to calculate state r of the forwarding behavior of the to-be-detected core router, and determining whether the forwarding behavior of the to-be-detected core router is abnormal according to the state r of the forwarding behavior of the to-be-detected core router, if yes, generating an alert log.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in an almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for detecting normalization of forwarding behavior of a router in a core routing area, comprising following steps:

obtaining data flow received by ports of a to-be-detected core router which are directly connected to peripheral network equipment;

generating a data flow state table initially, and performing matching check to the data flow according to the data flow state table;

if the data flow does not match the data flow state table, checking state of the data flow to obtain characteristic parameters of the data flow to calculate a state check result S(i);

determining whether the data flow state table needs to be updated, if yes, updating the data flow state table; and determining whether the state check result S(i) is a trigger state, if yes, using the to-be-detected core router together with the peripheral network equipment to calculate state r of the forwarding behavior of the to-be-detected core router, and determining whether the forwarding behavior of the to-be-detected core router is abnormal according to the state r of the forwarding behavior of the to-be-detected core router, if yes, generating an alert log.

2. The method of claim 1, wherein the data flow state table comprises: source network segment address, destination network segment address, input port, inquiry port, output port, the state check result S(i), and timer.

3. The method of claim 1, wherein the state check result S(i) satisfies following expressions:

$$S(i)=f_a(x_1,x_2) \oplus f_b(x_3)|_{f_a=0} + f_a(x_1,x_2) \oplus f_c(x_4)|_{f_a=1},$$

when initially $f_a=0$, $f_b=1$, $f_c=0$.

4. The method of claim 1, wherein the state r of the forwarding behavior of the core router satisfies a following expression:

$$r = \sum_{j=0}^{n} p(j),$$

and p(j) represents a port state corresponding to port j of the core router, and j=0, 1, 2, ..., n, p(j) is initially equal to zero, and p(j) is obtained according to determination of the state check result S(i).

5. The method of claim 4, further comprising:
when r≠0, determining the forwarding behavior of the core router is abnormal.

6. The method of claim 1, further comprising:
when one of following conditions is satisfied, updating the data flow state table:
1) storing a new entry corresponding a update entry for the data flow state table which is generated in step S3;
2) synchronization with dynamic change of a routing table being needed;
3) number of stored entry list of the data flow state table reaching a upper limit or timer being overdue.

7. A system for detecting normalization of forwarding behavior of a router in a core routing area, comprising: one or more hardware processor coupled to a memory, wherein the memory stores an obtaining module, a determining module and a processing module, wherein:
the obtaining module is configured to obtain port states P(j) of each to-be-detected router in the core routing area, one router in the core routing area being a peripheral network equipment to another router in the core routing area, data-flow matching check is performed to all peripheral network equipment, by using the method of claim 1, to generate the port states of a router whose forwarding behavior is abnormal, allowing the obtaining module to obtain;
the determining module is configured to calculate state r(k) of the forwarding behavior of each to-be-detected router in the core routing area, and determine whether r(k) is equal to zero, and if no, determine the forwarding behavior of a router k is abnormal; and
the processing module is configured to calculate state R of the forwarding behavior in the core routing area, and determine whether abnormal forwarding behavior exists in the core routing area according to the state R of the forwarding behavior, and if yes, generate an alert log.

8. The system of claim 7, wherein the state r(k) of the forwarding behavior of each to-be-detected router satisfies a following expression:

$$r(k) = \sum_{j=0}^{n} P_k(j),$$

and $P_k(j)$ represents a port state corresponding to port j of the k-th to-be-detected router, and j=0, 1, 2, ..., n, and r(k) is initially equal to zero.

9. The system of claim 7, wherein the state R of the forwarding behavior in the core routing area satisfies a following expression:

$$R = \sum_{k=1}^{m} r(k),$$

k=1, 2, ..., m, and m is number of the core router in the core routing area, and initially, R=0, if R after calculation is not equal to zero, the abnormal forwarding behavior existing in the core routing area is determined and the alert log is generated.

10. A non-transitory computer-readable storage medium having stored therein instructions that, when executed by a processor of a device, causes the device to perform a method for detecting normalization of forwarding behavior of a router in a core routing area, wherein the method comprises following steps:
obtaining data flow received by ports of a to-be-detected core router which are directly connected to peripheral network equipment;
generating a data flow state table initially, and performing matching check to the data flow according to the data flow state table;
if the data flow does not match the data flow state table, checking state of the data flow to obtain a state check result S(i) by obtaining characteristic parameters of the data flow;
determining whether the data flow state table needs to be updated, if yes, updating the data flow state table; and
determining whether the state check result S(i) is a trigger state, if yes, using the to-be-detected core router together with the peripheral network equipment to calculate state r of the forwarding behavior of the to-be-detected core router, and determining whether the forwarding behavior of the to-be-detected core router is abnormal according to the state r of the forwarding behavior of the to-be-detected core router, if yes, generating an alert log.

* * * * *